(12) United States Patent
Huang et al.

(10) Patent No.: US 12,085,451 B2
(45) Date of Patent: *Sep. 10, 2024

(54) INFRARED THERMOPILE SENSOR

(71) Applicant: ORIENTAL SYSTEM TECHNOLOGY INC., Hsin-Chu (TW)

(72) Inventors: Wen-Chie Huang, Hualien County (TW); Yu-Chih Liang, Hsinchu (TW); Chein-Hsun Wang, Hsin-Chu (TW); Ming Le, New Taipei (TW); Chen-Tang Huang, Hsinchu County (TW); Chein-Hsing Yu, Hsinchu County (TW); Tung-Yang Lee, Hsinchu County (TW); Jenping Ku, Hsinchu County (TW)

(73) Assignee: ORIENTAL SYSTEM TECHNOLOGY INC., Hsin-Chu (TW)

( * ) Notice: Subject to any disclaimer, the term of this patent is extended or adjusted under 35 U.S.C. 154(b) by 772 days.

This patent is subject to a terminal disclaimer.

(21) Appl. No.: 17/326,289

(22) Filed: May 20, 2021

(65) Prior Publication Data

US 2022/0341789 A1 Oct. 27, 2022

(30) Foreign Application Priority Data

Apr. 21, 2021 (TW) ................. 110204389

(51) Int. Cl.
*G01J 5/16* (2006.01)
*G01J 5/04* (2006.01)
*G01J 5/0806* (2022.01)

(52) U.S. Cl.
CPC ............... *G01J 5/16* (2013.01); *G01J 5/0806* (2013.01); *G01J 5/049* (2013.01)

(58) Field of Classification Search
CPC .... G01J 5/14; G01J 5/025; G01J 5/045; G01J 5/0025; G01J 5/0265; G01J 5/064;
(Continued)

(56) References Cited

U.S. PATENT DOCUMENTS

6,483,111 B1 * 11/2002 Ishikawa ................... G01J 5/20
250/338.4
9,989,409 B2 * 6/2018 Van Der Wiel ......... G01J 5/045
(Continued)

*Primary Examiner* — Brandi N Hopkins
*Assistant Examiner* — Janice M Soto
(74) *Attorney, Agent, or Firm* — Chun-Ming Shih; HDLS IPR SERVICES (57) ABSTRACT

An infrared thermopile sensor includes a silicon cover having an infrared lens, an infrared sensing chip having duo-thermopile sensing elements, and a microcontroller chip calculating a temperature of an object. The components are in a stacked 3D package to decrease the size of the infrared thermopile sensor. The infrared sensing chip and the microcontroller chip have metal layers to shield the thermal radiation. To measure object temperature accurately under acute change in environmental temperature, this disclosure uses the duo-thermopile sensing elements, that one is the active unit for measuring the object temperature and another one is the dummy unit for compensating the effect from the package structure.

19 Claims, 7 Drawing Sheets

(58) Field of Classification Search
CPC ........ G01J 5/12; G01J 5/70; G01J 5/16; G01J 5/0806; G01J 5/049; G01J 5/0011; G01K 7/028; G01K 7/06; G01K 7/01; G01K 15/005; G01K 13/223; G01K 1/14; G01K 1/20; G01K 13/00; G01K 7/02; G01K 7/015; G01K 7/22; G01K 13/02; G01K 7/04; G01K 7/12; G01K 1/00; G01K 1/02; G01K 1/08; G01K 17/00; G01K 17/20; G01K 7/00; G01K 7/006; G01K 7/16; G01K 7/186; H10N 10/817
USPC ........................ 374/121; 702/135; 250/338.1
See application file for complete search history.

(56) References Cited

U.S. PATENT DOCUMENTS

| | | | |
|---|---|---|---|
| 11,101,158 B1* | 8/2021 | Brown | H01L 21/0273 |
| 2003/0215056 A1* | 11/2003 | Vuorela | H01L 27/14634 |
| | | | 378/62 |
| 2013/0248711 A1* | 9/2013 | Lambkin | H01L 27/14649 |
| | | | 250/340 |
| 2015/0380627 A1* | 12/2015 | Emadi | G01J 5/12 |
| | | | 257/467 |
| 2019/0154511 A1* | 5/2019 | Van Buggenhout | G01J 5/026 |
| 2019/0285478 A1* | 9/2019 | Ali | G01J 5/14 |
| 2020/0249101 A1* | 8/2020 | Wang | H04R 1/1016 |
| 2020/0300711 A1* | 9/2020 | Tu | G01F 1/6845 |

* cited by examiner

INFRARED THERMOPILE SENSOR

BACKGROUND

Technical Field

The disclosure relates to a sensor, particularly relates to an infrared thermopile sensor.

Description of Related Art

Following popularity of true wireless stereo (TWS) earphone, the need for in-ear physiological function detection is increased accordingly. For example, the measurement of heart rate and temperature during exercise. To fit in the earphone application, the size of sensor must be small enough.

The thermopile sensor for traditional ear thermometer uses TO-46 type metal package which is too big to be integrated within TWS earphone. Another disadvantage of traditional ear thermometer is to put in a stable environment for at least 30 minutes before measurement which is not suitable for TWS earphone that needs plug and play immediately.

Current available SMD packaged thermopile sensor is about 3×3×1 $mm^3$ which is still too big to fit in TWS earphone.

Further, when the wireless earphone is being used, the user may take the wireless earphone directly from the pocket to put into the ear, and the acute change of ambient temperature may affect the accuracy of the non-contact infrared thermopile sensor. Therefore, how to overcome the acute change of ambient temperature for accurately measuring temperature is another object of the disclosure.

SUMMARY OF THE DISCLOSURE

The objective of this disclosure is to provide a miniature thermopile sensor that can be plug-and-play and measures object's temperature accurately.

In some embodiments of the disclosure, an infrared thermopile sensor includes an infrared sensing chip, a silicon cover, a microcontroller chip, a package substrate, and a sealing encapsulation. The infrared sensing chip includes a first substrate, a first thermopile sensing element, a second thermopile sensing element, and a front-end signal processing unit. The first substrate has a wire-bonding pad and two membrane structures configured by a front-side wet etching. The first thermopile sensing element is disposed on one of the membrane structures and generates an object corresponding temperature signal. The second thermopile sensing element is disposed on another one of the membrane structures and adjacent to the first thermopile sensing element, and generates a compensation temperature signal. The front-end signal processing unit is disposed on the first substrate and electrically connected with the first thermopile sensing element and the second thermopile sensing element. The front-end signal processing unit includes an ambient temperature sensing element, a non-volatile memory, and an amplifier and an analog-to-digital converter. The ambient temperature sensing element generates a calibrated ambient temperature information. The non-volatile memory is adapted to store the calibrated ambient temperature information of the ambient temperature sensing element. The amplifier and the analog-to-digital converter receive the object corresponding temperature signal and the compensation temperature signal, and amplify and convert the object corresponding temperature signal and the compensation temperature signal to a digital signal. The silicon cover is bonded to the infrared sensing chip by a wafer-level bonding, and includes an infrared Fresnel lens focusing a thermal radiation of the object to the first thermopile sensing element. The size of the silicon cover is smaller than the size of the infrared sensing chip, and the wire-bonding pads on the infrared sensing chip are exposed. The microcontroller chip is connected with the infrared sensing chip, and receives the digital signal generated by the front-end signal processing unit, and calculates the object temperature according to the calibrated ambient temperature information. The microcontroller chip includes a second substrate, a first metal layer, and a plurality of through silicon vias (TSVs). The first metal layer is disposed on an upper surface of the second substrate and includes a metal material with low emissivity to reduce the thermal disturbance from the microcontroller chip to the infrared sensing chip. The TSVs are disposed in the second substrate. The package substrate carries the microcontroller chip, and receives an output signal or an input signal of the microcontroller chip through the TSVs, and has a plurality of contacts disposed on a lower surface thereof. The TSVs are electrically connected with the contacts. The sealing encapsulation covers the package substrate, the microcontroller chip, the infrared sensing chip, and the silicon cover. The upper surface of the silicon cover is exposed from the sealing encapsulation.

In some embodiments of the disclosure, the microcontroller chip calculates the object temperature according to the calibrated ambient temperature information after subtracting the compensation temperature signal from the object corresponding temperature signal.

In some embodiments of the disclosure, the microcontroller chip calculates the object temperature according to the calibrated ambient temperature information after subtracting the compensation temperature signal multiplied with a first parameter from the object corresponding temperature signal.

In some embodiments of the disclosure, the infrared sensing chip and the microcontroller chip are glued together by a die attach film (DAF).

In some embodiments of the disclosure, the first substrate has a second metal layer disposed on a lower surface thereof.

In some embodiments of the disclosure, the front-end signal processing unit further has a signal selection multiplexer and a communication interface electrically connected with the ambient temperature sensing element and the non-volatile memory.

In some embodiments of the disclosure, the ambient temperature sensing element has at least one thermal sensitive diode.

In some embodiments of the disclosure, the diode is a Schottky diode.

In some embodiments of the disclosure, the silicon cover and the infrared sensing chip are bonded together by the wafer-level bonding with a photoresist layer and an adhesive.

In some embodiments of the disclosure, a thickness of the photoresist layer is greater than or equal to about 50 µm and less than or equal to about 100 µm.

In some embodiments of the disclosure, the silicon cover has a third metal layer disposed on a lower surface thereof corresponding to the second thermopile sensing element.

In some embodiments of the disclosure, the silicon cover has a first cavity and a second cavity corresponding to the first thermopile sensing element and the second thermopile sensing element respectively, and the silicon cover and the infrared sensing chip are bonded together by the wafer-level bonding with a eutectic bonding or a solder bonding.

In some embodiments of the disclosure, when the silicon cover and the infrared sensing chip are bonded together, the first cavity and the second cavity seal the first thermopile sensing element and the second thermopile sensing element respectively by a vacuum encapsulation.

In some embodiments of the disclosure, a depth of the first cavity is greater than or equal to about 50 μm and less than or equal to about 100 μm.

In some embodiments of the disclosure, the silicon cover has a fourth metal layer disposed on the upper surface thereof corresponding to the second thermopile sensing element.

In some embodiments of the disclosure, the metal material of the first metal layer has an aluminum.

In some embodiments of the disclosure, the infrared sensing chip is a silicon on insulator (SOI) chip, and a packaging height of the infrared thermopile sensor is less than 1 mm.

In some embodiments of the disclosure, a depth of an oxide insulating layer in the SOI chip is greater than about 2 μm.

In some embodiments of the disclosure, the depth of the oxide insulating layer is greater than about 10 μm.

In summary, the infrared thermopile sensor of the disclosure uses the stacked 3D package to reduce the volume, such as about 2×2×1.2 $mm^3$. Further, the infrared thermopile sensor includes a silicon cover with a lens using to confine the viewing angle to less than 30 degrees and an infrared sensing chip having duo-thermopile sensing elements. One of the thermopile sensing elements is the active unit for measuring the object temperature, and another one of the thermopile sensing elements is the compensation unit (dummy unit) for compensating the influence of the package structure. Thus, the infrared thermopile sensor of the disclosure may accurately measure the temperature under the acute change of ambient temperature.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

Embodiments, or examples, of the disclosure illustrated in the drawings are now described using specific language. It shall be understood that no limitation of the scope of the disclosure is hereby intended. Any alteration or modification of the described embodiments, and any further applications of principles described in this document, are to be considered as normally occurring to one of ordinary skill in the art to which the disclosure relates. Reference numerals may be repeated throughout the embodiments, but this does not necessarily mean that feature(s) of one embodiment apply to another embodiment, even if they share the same reference numeral.

It shall be understood that, although the terms first, second, third, etc., may be used herein to describe various elements, components, regions, layers, or sections, these elements, components, regions, layers, or sections are not limited by these terms. Rather, these terms are merely used to distinguish one element, component, region, layer, or section from another region, layer, or section. Thus, a first element, component, region, layer, or section discussed below could be termed a second element, component, region, layer, or section without departing from the teachings of the present inventive concept.

Figure 1:
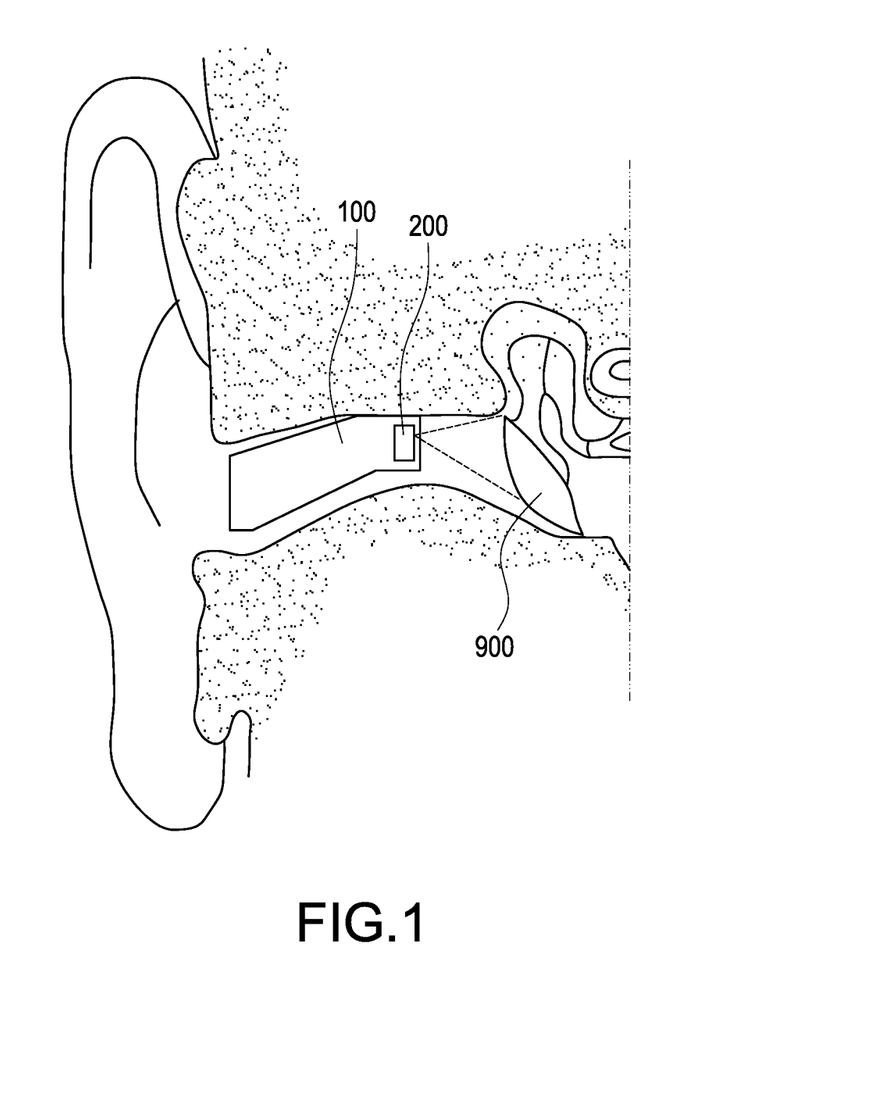
FIG. 1 is a schematic diagram of the usage scenario of an infrared thermopile sensor, in accordance with some embodiments of the disclosure.

FIG. 1 is a schematic diagram of the usage scenario of an infrared thermopile sensor, in accordance with some embodiments of the disclosure. As shown in FIG. 1, a wireless earphone 100 may include an infrared thermopile sensor 200 embedded therein. The wireless earphone 100 may be a True Wireless Stereo (TWS) earphone, such as but not limited to an in-ear Bluetooth earphone. When the user puts the wireless earphone 100 into the ear, the eardrum (the object 900) is the object for the infrared thermopile sensor 200 to sense the temperature. In other words, when the wireless earphone 100 is in usage, the infrared thermopile sensor 200 senses the temperature of the eardrum instead of the temperature of the ear canal. Therefore, the viewing angle (field of view, FOV) of the infrared thermopile sensor 200 needs to be confined to less than 30 degrees. Regarding that, as described hereinafter, the infrared thermopile sensor 200 of the disclosure integrates with infrared Fresnel lens to modify the viewing angle for receiving the thermal radiation of the object to be measured.

Moreover, as described hereinafter, the infrared thermopile sensor 200 of the disclosure further has a silicon cover. The micro structure of the silicon cover may reduce the thermal effect of the package structure. The silicon cover has a higher thermal conductivity coefficient (for example, about 148 W/m/K), thereby the silicon cover has better thermal conductivity and temperature uniformity. As a result, the differences between the thermal radiation of the package structure received by the duo-thermopile sensing elements may be minimized.

Figure 2:
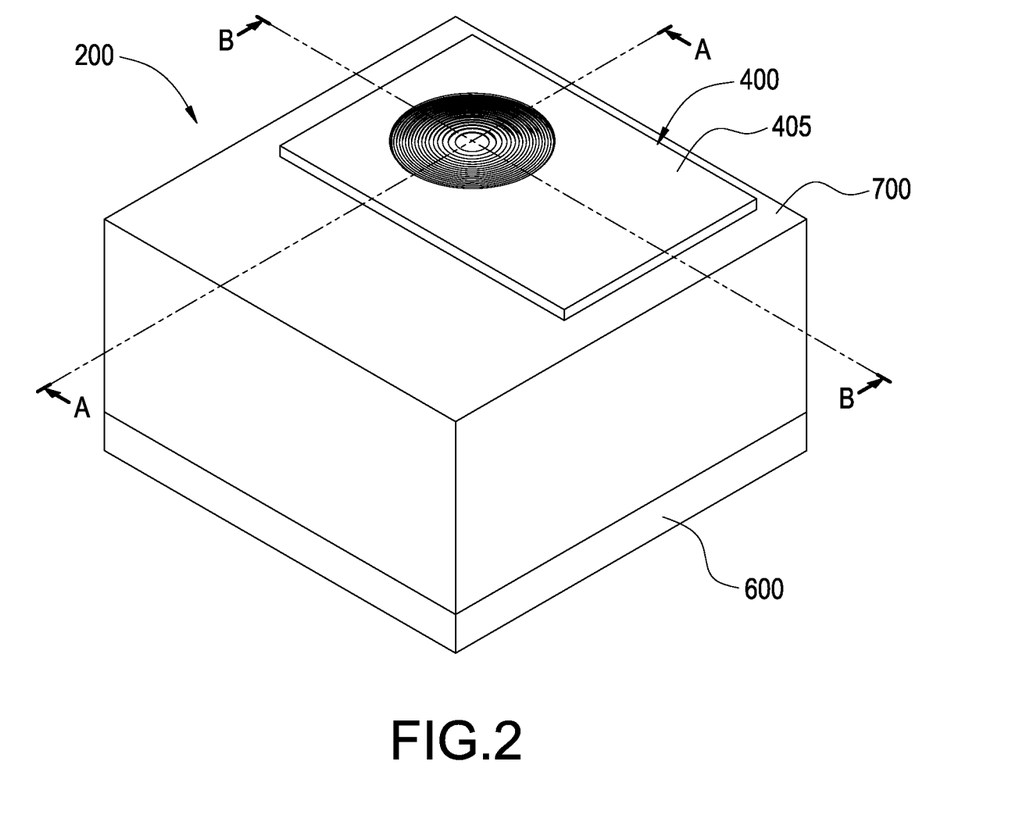
FIG. 2 is a schematic diagram of an infrared thermopile sensor, in accordance with some embodiments of the disclosure.
Figure 3:
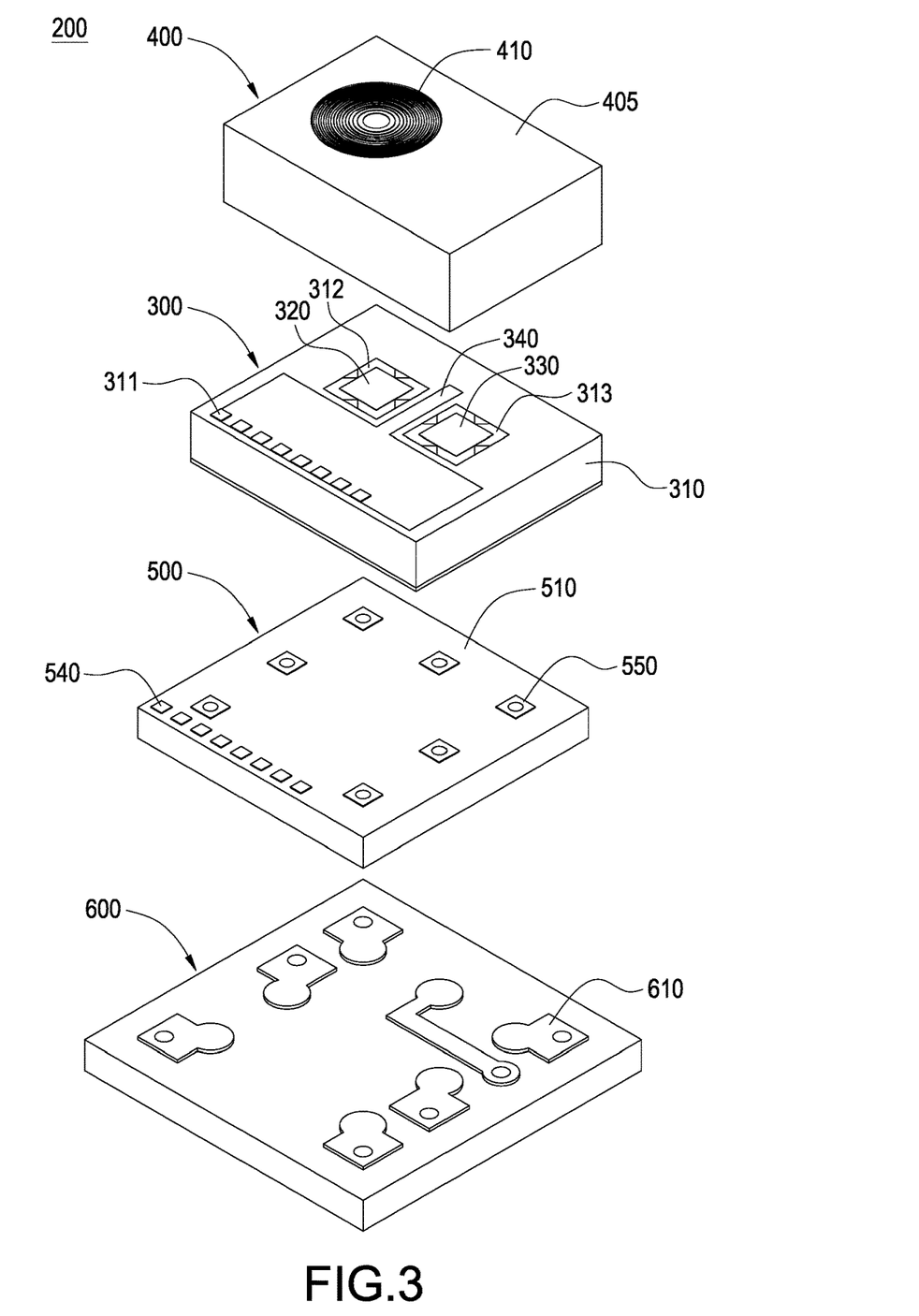
FIG. 3 is an exploded diagram of the infrared thermopile sensor, in accordance with some embodiments of the disclosure.
Figure 4A:
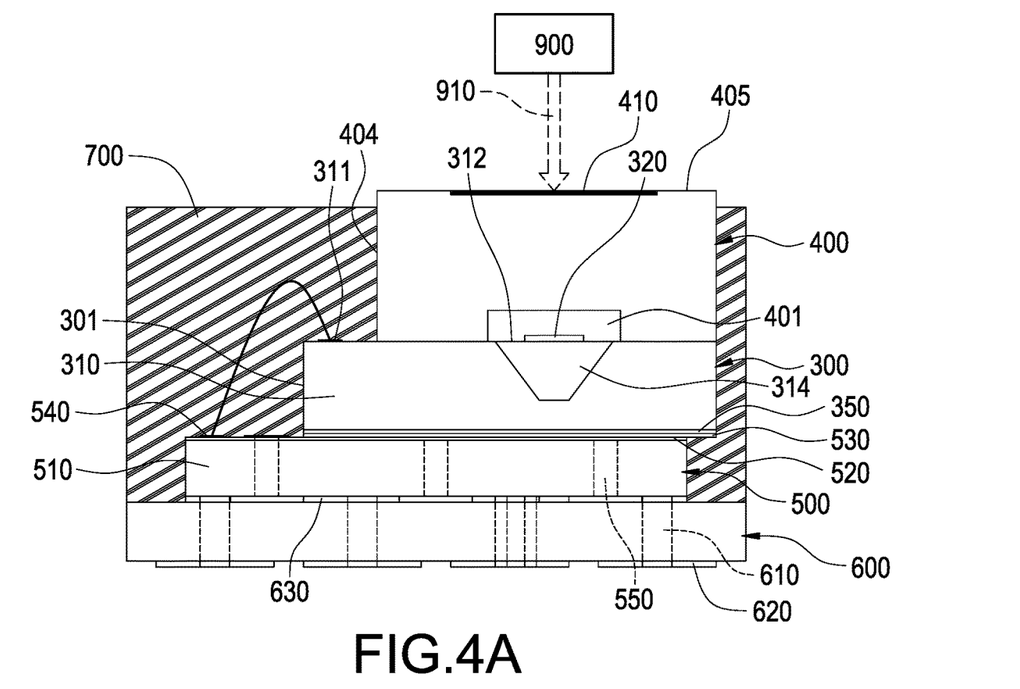
FIG. 4A is a cross-sectional diagram along the line A-A in FIG. 2.
Figure 4B:
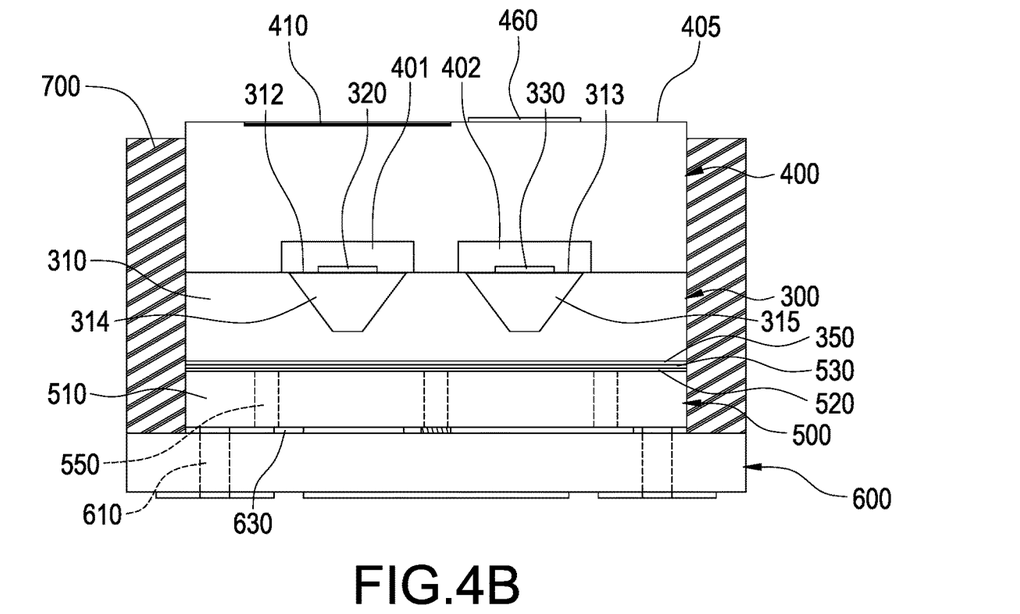
FIG. 4B is a cross-sectional diagram along the line B-B in FIG. 2.

FIG. 2 is a schematic diagram of an infrared thermopile sensor, in accordance with some embodiments of the disclosure. FIG. 3 is an exploded diagram of the infrared thermopile sensor, in accordance with some embodiments of the disclosure. FIG. 4A is a cross-sectional diagram along the line A-A in FIG. 2. FIG. 4B is a cross-sectional diagram along the line B-B in FIG. 2.

Referring to FIG. 2, FIG. 3, FIG. 4A, and FIG. 4B, the infrared thermopile sensor 200 of the disclosure includes an infrared sensing chip 300, a silicon cover 400, a microcontroller chip 500, a package substrate 600, and a sealing encapsulation 700.

In some embodiments, the infrared sensing chip 300 includes a first substrate 310, a first thermopile sensing element 320, a second thermopile sensing element 330, and a front-end signal processing unit 340. In some embodiments, the first substrate 310 has a wire-bonding pad 311 and two membrane structures (or floating plate structures) 312, 313 formed by a front-side wet etching. The wire-bonding pad 311 and the membrane structures 312, 313 are disposed correspondingly. In some embodiments, the wire-bonding pad 311 is disposed on the edge of the first substrate 310 for wire bonding to the microcontroller chip 500, and the membrane structures 312, 313 are disposed away from the wire-bonding pad 311 and disposed corresponding to the silicon cover 400.

In some embodiments, the first substrate 310 further includes two concave portions 314, 315 corresponding to the membrane structures 312, 313 respectively. In other words, the membrane structure 312 is located above the concave portion 314, and the membrane structure 313 is located above the concave portion 315.

In some embodiments, the first thermopile sensing element 320 is disposed on the membrane structure 312 corresponding to the concave portion 314. A hot junction of the first thermopile sensing element 320 is located on the membrane structure 312, and a cold junction of the first thermopile sensing element 320 is located on the periphery of the concave portion 314. The first thermopile sensing element 320 may sense an object temperature 900 (for example, the eardrum in FIG. 1) and generate an object corresponding temperature signal.

In some embodiments, the second thermopile sensing element 330 is disposed on the membrane structure 313 corresponding to the concave portion 315. The second thermopile sensing element 330 is disposed adjacent to the first thermopile sensing element 320. A hot junction of the second thermopile sensing element 330 is located on the membrane structure 313, and a cold junction of the second thermopile sensing element 330 is located on the periphery of the concave portion 315. The window portion of the second thermopile sensing element 330 is shielded, thereby the second thermopile sensing element 330 may merely sense the thermal radiation of the silicon cover 400 to generate a compensation temperature signal.

In some embodiments, the front-end signal processing unit 340 is disposed on the first substrate 310 and electrically connected with the first thermopile sensing element 320 and the second thermopile sensing element 330.

Figure 5:
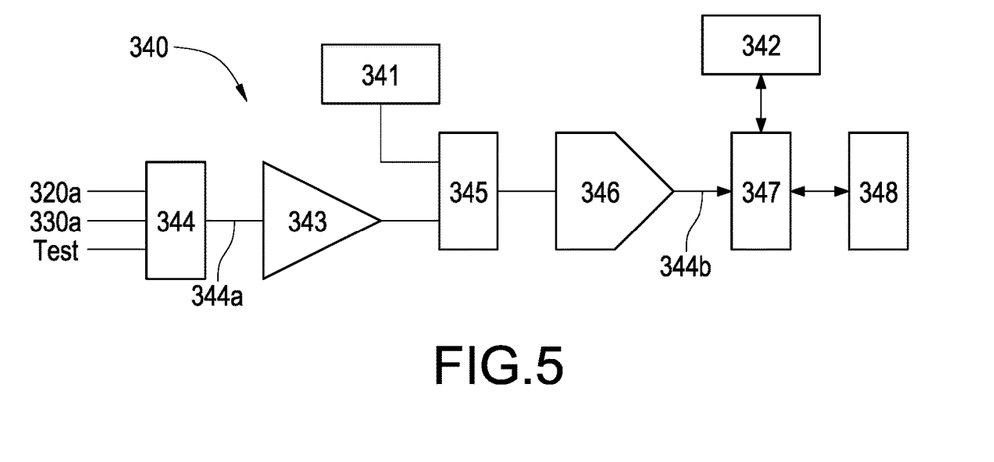
FIG. 5 is a block diagram of the front-end signal processing unit of the infrared thermopile sensor, in accordance with some embodiments of the disclosure.

FIG. 5 is a block diagram of the front-end signal processing unit of the infrared thermopile sensor, in accordance with some embodiments of the disclosure. As shown in FIG. 5, in some embodiments, the front-end signal processing unit 340 at least includes an ambient temperature sensing element 341 and a non-volatile memory 342. During the calibration phase, the ambient temperature sensing element 341 may generate a calibrated ambient temperature information. In other words, ambient temperature sensing element 341 may generate an ambient temperature the that is calibrated by on-chip non-volatile memory information. During the ambient temperature calibration phase, the analog signal of ambient temperature sensing element 341 is converted into a digital signal by an analog-to-digital converter (ADC) 346, the digital signal is transmitted to the microcontroller chip 500 through a communication interface 348. The digital signal is computed by the microcontroller chip 500 to calculate the calibration parameter and then store back to the non-volatile memory 342 through the communication interface 348.

In some embodiments, the ambient temperature sensing element 341 includes at least one thermal sensitive diode that is sensitive to temperature change, such as, but not limited to, a Schottky diode. In some embodiments, the ambient temperature sensing element 341 may be configured by a plurality of Schottky diodes connected in series.

In some embodiments, the front-end signal processing unit 340 may further include a low-noise low-offset amplifier 343, a plurality of signal selection multiplexers 344, 345, an ADC 346, a register 347, and a communication interface 348. The elements are electrically connected with the ambient temperature sensing element 341 and the non-volatile memory 342, respectively.

In some embodiments, the signal selection multiplexer 344 makes a selection based on the object corresponding temperature signal 320a of the first thermopile sensing element 320, the compensation temperature signal 330a of the second thermopile sensing element 330, and a self-testing signal Test, and generates an output signal 344a to the low-noise low-offset amplifier 343. The low-noise low-offset amplifier 343 amplifies the output signal 344a and outputs that to the signal selection multiplexer 345.

The signal selection multiplexer 345 may select the ambient temperature sensing element 341 or amplified output signal 344a, and then output to the ADC 346 for analog to digital conversion. In some embodiments, the ADC 346 may be, for example, a sigma-delta converter. The converted digital signal 344b is outputted to the register 347, and is further outputted to the microcontroller chip 500 through the communication interface 348.

It is worth mentioning that when the probe testing is performed to the infrared sensing chip 300, the ambient temperature sensing element 341 may be calibrated simultaneously. The calibration parameters of the ambient temperature sensor 341 may be stored in the non-volatile memory 342 through the register 347 and the communication interface 348. When the microcontroller chip 500 is powered up, the microcontroller chip 500 may read the calibrated ambient temperature information of the ambient temperature sensing element 341 stored in the non-volatile memory 342 through the register 347 and the communication interface 348. Thus, the microcontroller chip 500 may calculate the object temperature 900 based on the digital signal 344b of the front-end signal processing unit 340 and pre-stored calibrated ambient temperature information.

Referring to FIG. 2, FIG. 3, FIG. 4A, and FIG. 4B, the silicon cover 400 is connected with the infrared sensing chip 300 by a wafer-level bonding. The silicon cover 400 includes an infrared Fresnel lens 410. The infrared Fresnel lens 410 is used for focusing a thermal radiation 910 of the object 900 to the first thermopile sensing element 320. The size of the silicon cover 400 is smaller than the size of the infrared sensing chip 300. The wire-bonding pad 311 of the infrared sensing chip 300 is exposed from the silicon cover 400. In some embodiments, the infrared Fresnel lens 410 of the silicon cover 400 may be manufactured by a semiconductor process. It is worth mentioning that a diameter of the first thermopile sensing element 320 is about 400 μm and a focal length of the lens needs to be about 200 μm, and the focal length is difficult to be achieved by a traditional convex lens. Therefore, the disclosure uses the infrared Fresnel lens 410 manufactured by the semiconductor process to achieve the requirement.

Figure 6A:
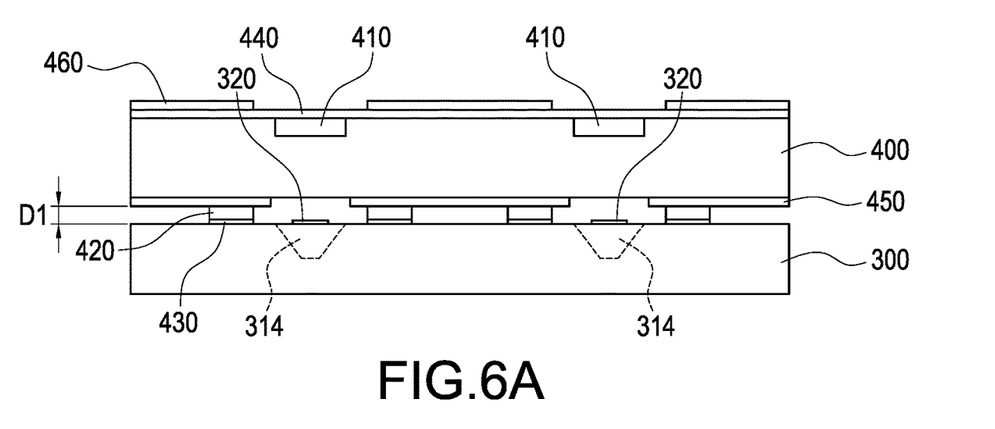
FIG. 6A is a schematic diagram of the silicon cover and the infrared sensing chip being wafer-level bonded, in accordance with some embodiments of the disclosure.
Figure 6B:
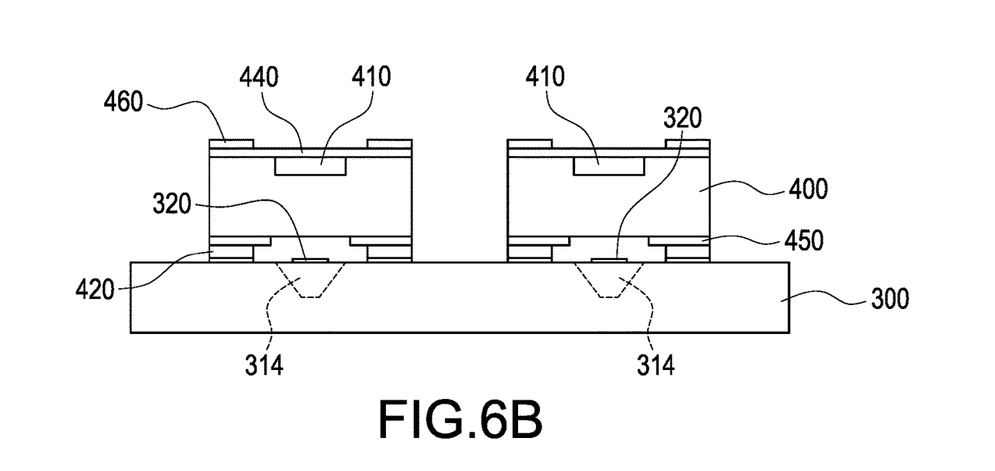
FIG. 6B is a schematic diagram of the silicon cover being diced.

FIG. 6A is a schematic diagram of the silicon cover and the infrared sensing chip being wafer-level bonded, in accordance with some embodiments of the disclosure. FIG. 6B is a schematic diagram of the silicon cover being diced. As shown in FIG. 6A, in some embodiments, the silicon cover 400 and the infrared sensing chip 300 may be connected with each other by the wafer-level bonding with a photoresist layer (photoresist standoff layer) 420 and an adhesive 430. The photoresist layer 420 may be used as a standoff. A thickness of the photoresist layer 420 is greater than or equal to about 50 μm and less than or equal to about 100 μm. In other words, the silicon cover 400, for example, may use the photoresist layer 420 (such as SU-8 photoresist) to elevate a distance with the infrared sensing chip 300 therebetween to at least about 50 μm. In some embodiments, the distance D1 between the silicon cover 400 and the infrared sensing chip 300 may be about 100 μm. Thus, the effect from the gas heat conduction in the silicon cover 400 that might reduce the sensitivity of first thermopile sensing element 320 is reduced.

In some embodiments, the silicon cover 400 may further include an anti-reflection coating 440, a third metal layer 450, and a fourth metal layer 460. The anti-reflection coating 440 is disposed on the infrared Fresnel lens 410 to increase the transmission efficiency of the infrared Fresnel lens 410. The third metal layer 450 is disposed on a lower surface of the silicon cover 400 corresponding to the second thermopile sensing element 330 for shielding the second thermopile sensing element 330 from incidence of the thermal radiation of the object. The fourth metal layer 460 is disposed on the upper surface of the silicon cover 400 corresponding to the second thermopile sensing element 330. The opening window allows the incidence of external thermal radiation to the first thermopile sensing element 320 and prevents the oblique light from entering the second thermopile sensing element 330. In some embodiments, the fourth metal layer 460 may not be disposed on the upper surface of the silicon cover 400. As shown in FIG. 6B, after the silicon cover 400 is diced, the third metal layer 450 disposed on the lower surface of the silicon cover 400 may prevent the oblique light from entering the second thermopile sensing element (dummy unit) 330 by the infrared Fresnel lens 410. The third metal layer 450 is disposed on top of second thermopile sensor 330 to block the thermal radiation input from the object.

Figure 7A:
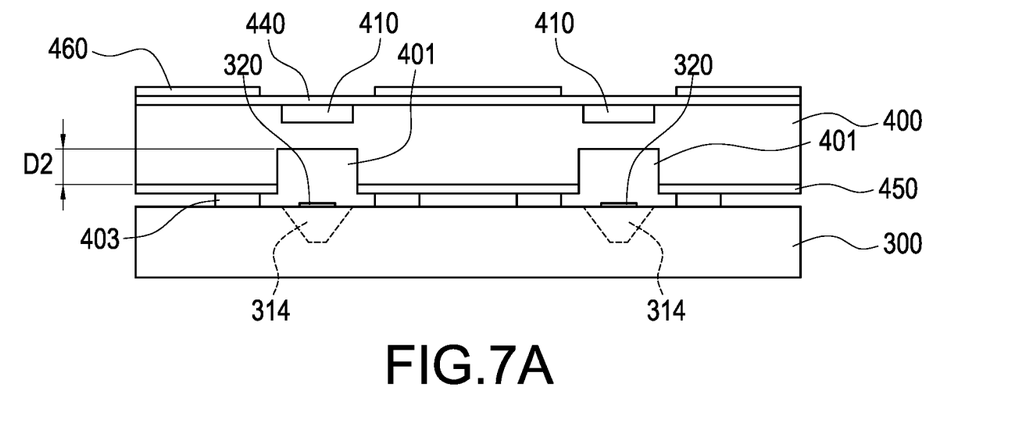
FIG. 7A is a schematic diagram of the silicon cover and the infrared sensing chip being wafer-level bonded, in accordance with some other embodiments of the disclosure.
Figure 7B:
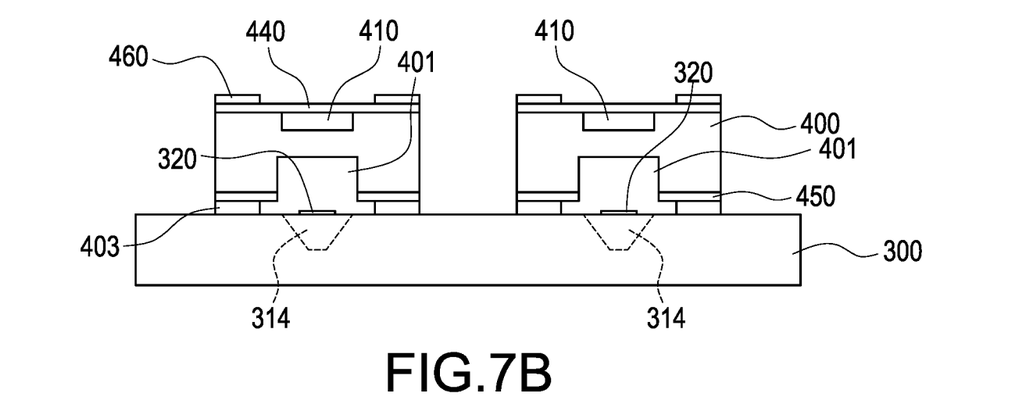
FIG. 7B is a schematic diagram of the silicon cover being diced.

FIG. 7A is a schematic diagram of the silicon cover and the infrared sensing chip using wafer-level bonded, in accordance with some other embodiments of the disclosure. FIG. 7B is a schematic diagram of the silicon cover being diced. As shown in FIG. 7A, in some embodiments, the silicon cover 400 may include a first cavity 401 and a second cavity 402 (referring to FIG. 4B) corresponding to the first thermopile sensing element 320 and the second thermopile sensing element 330, respectively. The silicon cover 400 and the infrared sensing chip 300 are connected with each other by the wafer-level bonding with a eutectic bonding or a solder bonding.

In some embodiments, a silicon deep reactive-ion etching (RIE) may be used to form the first cavity 401 and the second cavity 402 on the silicon cover 400 corresponding to the first thermopile sensing element 320 and the second thermopile sensing element 330, respectively. A depth D2 of the first cavity 401 and a depth of the second cavity 402 may be respectively greater than or equal to about 50 μm and less than or equal to about 100 μm. In some embodiments, the depth D2 of the first cavity 401 and the depth of the second cavity 402 may be about 100 μm, here is not intended to be limiting. It is worth mentioning that when the silicon cover 400 and the infrared sensing chip 300 are under the process of the wafer-level bonding, the first cavity 401 and the second cavity 402 may seal the first thermopile sensing element 320 and the second thermopile sensing element 330, respectively by a vacuum encapsulation to increase the sensitivity of the sensing elements. Further, the silicon cover 400 may be connected with the infrared sensing chip 300 by the eutectic bonding or the solder bonding with a metal bump (weld leg) 403. As shown in FIG. 7B, after the silicon cover 400 is diced, the fourth metal layer 460 disposed on the upper surface of the silicon cover 400 may prevent the oblique light from entering the second thermopile sensing element (dummy unit) 330 by the infrared Fresnel lens 410. Moreover, the third metal layer 450 may similarly be disposed on the lower surface of the silicon cover 400 to shield the incidence of external thermal radiation to the first thermopile sensing element 320 and prevents the oblique light from entering the second thermopile sensing element 330. Similarly, the third metal layer 450 may not be disposed on the lower surface of the silicon cover 400.

When the silicon cover 400 utilizes the cavity structure and is connected with the infrared sensing chip 300 by vacuum wafer-level bonding, the infrared sensing chip 300 may utilize a silicon on insulator (SOI) chip. A depth (formation depth) of an oxide insulating layer in the SOI chip may be greater than about 2 μm. In some embodiments, the depth may be about 10 μm. That may be used to decrease the thickness of the infrared sensing chip 300 and further reduce the whole height of the infrared thermopile sensor 200 to less than about 1 mm.

Specifically, when the silicon cover 400 is too close with the membrane structures 312, 313 where the first thermopile sensing element 320 and the second thermopile sensing element 330 are disposed, the gas heat conduction may cause heat loss for the sensing elements and further decrease the sensitivity. Therefore, the first cavity 401 and the second cavity 402 may be disposed on the silicon cover 400 to increase the distance between the silicon cover 400 and the membrane structures 312, 313. On the other hand, as shown in FIG. 6A and FIG. 6B, when the photoresist layer 420 is used to increase the distance between the silicon cover 400 and the membrane structures 312, 313, the cavity may not need to be disposed on the silicon cover 400.

Referring back to FIG. 2, FIG. 3, FIG. 4A, and FIG. 4B, in some embodiments, a length of the edge 404 of the silicon cover 400 is less than a length of the edge 301 of the infrared sensing chip 300 in about 200 μm to about 400 μm. Thus, when the silicon cover 400 is combined and diced with the infrared sensing chip 300, the wire-bonding pad 311 of the infrared sensing chip 300 is exposed from the silicon cover 400.

In some embodiments, the microcontroller chip 500 is connected with the infrared sensing chip 300. The microcontroller chip 500 receives the object corresponding temperature signal and compensation temperature signal being digitalized by the front-end signal processing unit 340 (i.e., digital signal 344b). The microcontroller chip 500 calculates an object temperature 900 according to the calibrated ambient temperature information. In some embodiments, the microcontroller chip 500 includes a second substrate 510 and a first metal layer 520. The infrared sensing chip 300 and the microcontroller chip 500 are glued together by a die attach film (DAF) 530.

The temperature of the microcontroller chip 500 is relatively high during working, and the surface of the microcontroller chip 500 may generate thermal radiation to be received by the sensing elements of the infrared sensing chip 300, and the accuracy of measuring temperature may be influenced. Thus, the first metal layer 520 with a metal material of low emissivity may be disposed on the upper surface of the second substrate 510 to reduce the thermal disturbance from the microcontroller chip 500 to the infrared sensing chip 300. In some embodiments, the first metal layer 520 is disposed as the uppermost metal layer of the microcontroller chip 500. The metal material of the first metal layer 520 may include an aluminum.

It should be noted that, in some other embodiments, the first substrate 310 of the infrared sensing chip 300 may also include a second metal layer 350 disposed on the lower surface of the first substrate 310. In other words, the first metal layer 520 and the second metal layer 350 used for isolating the thermal radiation may be simultaneously disposed on the upper surface of the microcontroller chip 500 and the lower surface of the infrared sensing chip 300, respectively. The first metal layer 520 and the second metal layer 350 are spaced with the DAF 530, which is non-conductive in heat. Thus, the heat shielding function may be improved. Specifically, when the first metal layer 520 and the second metal layer 350 are used simultaneously, the first metal layer 520 with low emissivity may reduce the influence of the thermal radiation from the microcontroller chip 500. Further, the DAF 530 is the non-conductive layer for heat, and the thermal resistance from the microcontroller chip 500 to the infrared sensing chip 300 may be increased. The second metal layer 350 under the infrared sensing chip 300 may further block the secondary thermal radiation from the first metal layer 520 of the microcontroller chip 500.

In some embodiments, one side of the microcontroller chip 500 may have a wire-bonding pad 540 for connecting with the infrared sensing chip 300 by wire bonding. The other sides of the microcontroller chip 500 may utilize a plurality of through silicon vias (TSVs) 550 disposed in the second substrate 510 for electrically connecting with the package substrate 600.

In some embodiments, the package substrate 600 carries the microcontroller chip 500 and receives an output signal or an input signal of the microcontroller chip 500 through the TSVs 550. The package substrate 600 may include a plurality of through hole vias 610 (FIG. 3 shows via pad) and a plurality of contacts 620 on the lower surface of the package substrate 600. The TSVs 550 of the microcontroller chip 500 are electrically connected with the vias 610 and the contacts 620 of the package substrate 600. In some embodiments, the package substrate 600 and the microcontroller chip 500 may be connected by the solder paste 630. Therefore, the package substrate 600 may re-route the signal of the microcontroller chip 500 to the contacts 620 on the lower surface through the vias 610. The contacts 620 may be formed as the lead of the surface mount component (SMD) package.

In some embodiments, the sealing encapsulation 700 covers the package substrate 600, the microcontroller chip 500, the infrared sensing chip 300, and the silicon cover 400. The upper surface 405 of the silicon cover 400 is exposed from the sealing encapsulation 700.

Referring to FIG. 4A, and FIG. 4B, the first thermopile sensing element 320 is the active unit and receives the thermal radiation 910 of the object 900 through the infrared Fresnel lens 410 on the silicon cover 400. The second thermopile sensing element 330 is the compensation unit (dummy unit) and is shielded by the fourth metal layer 460 of the silicon cover 400. Thus, the second thermopile sensing element 330 may merely accept the thermal radiation in the second cavity 402 of the silicon cover 400. The first thermopile sensing element 320 and the second thermopile sensing element 330 are symmetrical in structure, and the material of the silicon cover 400 has preferable thermal conductivity, thereby the second thermopile sensing element 330 may be used to compensate for the thermal radiation of the silicon cover 400 for further accurately measuring the temperature.

In some embodiments, the second thermopile sensing element 330 and the first thermopile sensing element 320 are series-opposing connection. Thus, the object temperature may be calculated by directly subtracting the compensation temperature signal of the second thermopile sensing element 330 from the object corresponding temperature signal of the first thermopile sensing element 320 and then calculating the object temperature using the calibrated ambient temperature information.

In some other embodiments, when there is a difference in sensitivity between the first thermopile sensing element 320 and the second thermopile sensing element 330, and directly subtracting the compensation temperature signal of the second thermopile sensing element 330 is still unable to compensate the thermal radiation of the silicon cover 400, the compensation temperature signal of the second thermopile sensing element 330 may multiply a first parameter Ktp, and then is subtracted from the object corresponding temperature signal. The step of acquiring the first parameter Ktp is as below:

VTP1 is defined as the numerical value of the object corresponding temperature signal received by the first thermopile sensing element 320, VTP2 is defined as the numerical value of the compensation temperature signal received by the second thermopile sensing element 330, and the compensated thermal sensing output Vdet is:

$$Vdet=VTP1-Ktp \times VTP2$$

In other words, the first parameter Ktp is the parameter when the first thermopile sensing element 320 is shielded from the thermal radiation input and the output Vdet is zero, which is Ktp=VTP2/VTP1.

In summary, the infrared thermopile sensor 200 of the disclosure integrates the infrared Fresnel lens 410 to modify the viewing angle of the first thermopile sensing element 320 (active unit). Further, the infrared thermopile sensor 200 of the disclosure uses the micro structure of the silicon cover 400 may reduce the thermal effect of the package structure. The silicon cover 400 has a higher thermal conductivity coefficient (for example, about 148 W/m/K), thereby the silicon cover has better thermal conductivity and temperature uniformity. As a result, the differences between the thermal radiation of the package structure accepted by the duo-thermopile sensing elements 320, 330 may be minimized.

Figure 8:
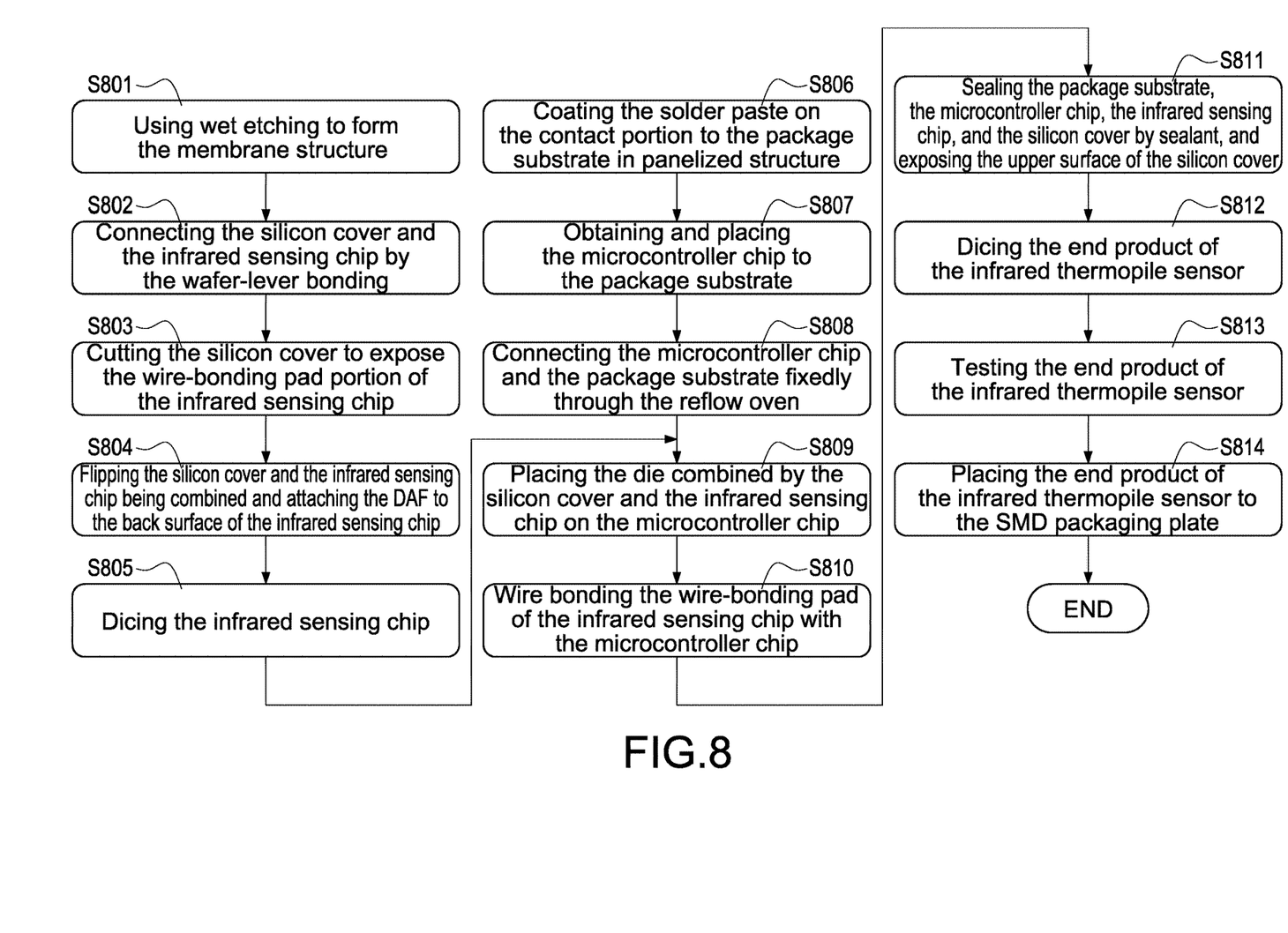
FIG. 8 is a flow diagram of the manufacturing method of the infrared thermopile sensor, in accordance with some embodiments of the disclosure.

FIG. 8 is a flow diagram of the manufacturing method of the infrared thermopile sensor, in accordance with some embodiments of the disclosure. Referring to FIG. 4A, FIG. 4B, and FIG. 8, the manufacturing method of the infrared thermopile sensor of the disclosure includes the step S801 to the step S814. The step S801 is using wet etching to form the membrane structure (floating plate structure) 312, 313 on the first substrate 310 of the infrared sensing chip 300. The step S802 is connecting the silicon cover 400 and the infrared sensing chip 300 by the wafer-lever bonding. The step S803 is cutting the silicon cover 400 to expose the wire-bonding pad 311 portion of the infrared sensing chip 300. The step S804 is flipping the silicon cover 400 and the infrared sensing chip 300 being combined and attaching the DAF to the back surface of the infrared sensing chip 300. The step S805 is dicing the infrared sensing chip 300.

The step S806 is coating the solder paste on the contact portion to the package substrate 600 in panelized structure. The step S807 is obtaining and placing the microcontroller chip 500 to the package substrate 600. The step S808 is fixedly connecting the microcontroller chip 500 and the package substrate 600 through the reflow oven. The step S809 is placing the die combined by the silicon cover 400 and the infrared sensing chip 300 on the microcontroller chip 500. The step S810 is wire bonding the wire-bonding pad 311 of the infrared sensing chip 300 with the microcontroller chip 500. The step S811 is disposing the sealing encapsulation 700 to seal the package substrate 600, the microcontroller chip 500, the infrared sensing chip 300, and the silicon cover 400 by sealant, and exposing the upper surface 405 of the silicon cover 400 to protect the wire bonding portions of the infrared sensing chip 300 and the microcontroller chip 500. The step S812 is dicing the end product of the infrared thermopile sensor 200. The step S813 is testing the end product of the infrared thermopile sensor 200. The step S814 is placing the end product of the infrared thermopile sensor 200 to the SMD packaging plate.

In summary, the infrared thermopile sensor of the disclosure uses the stacked 3D package to reduce the volume, such as about $2\times2\times1.2$ mm$^3$. Further, the infrared thermopile sensor includes a silicon cover with a lens using to confine the viewing angle to less than 30 degrees, an infrared sensing chip having duo-thermopile sensing elements, and a microcontroller chip for calculating the object temperature. One of the thermopile sensing elements is the active unit for measuring the object temperature, and another one of the thermopile sensing elements is the compensation unit (dummy unit) for compensating the influence of the package structure. The top surface of microcontroller is a low emissivity metal layer to reduce the thermal disturbance of microcontroller to the thermopile sensing elements. Thus, the infrared thermopile sensor of the disclosure may accurately measure the temperature under the acute change of ambient temperature.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An infrared thermopile sensor, comprising:
   an infrared sensing chip, comprising:
   a first substrate, comprising a wire-bonding pad and two membrane structures configured by a front-side wet etching;
   a first thermopile sensing element, disposed on one of the membrane structures and generating an object corresponding temperature signal;
   a second thermopile sensing element, disposed on another one of the membrane structures and adjacent to the first thermopile sensing element, and generating a compensation temperature signal; and
   a front-end signal processing unit, disposed on the first substrate and electrically connected with the first thermopile sensing element and the second thermopile sensing element, the front-end signal processing unit comprising:
   an ambient temperature sensing element, generating a calibrated ambient temperature information;
   a non-volatile memory, adapted to store the calibrated ambient temperature information of the ambient temperature sensing element; and
   an amplifier and an analog-to-digital converter, receiving the object corresponding temperature signal and the compensation temperature signal, and amplifying and converting the object corresponding temperature signal and the compensation temperature signal to a digital signal;
   a silicon cover, bonded to the infrared sensing chip by a wafer-level bonding, and comprising an infrared Fresnel lens focusing a thermal radiation of the object to the first thermopile sensing element, a size of the silicon cover being smaller than a size of the infrared sensing chip, and the wire-bonding pad exposed from the silicon cover;
   a microcontroller chip, connected with the infrared sensing chip, and receiving the digital signal generated by the front-end signal processing unit, and calculating an object temperature according to the calibrated ambient temperature information, the microcontroller chip comprising:
   a second substrate; and
   a first metal layer, disposed on an upper surface of the second substrate and comprising a metal material with a low emissivity to reduce thermal disturbance from the microcontroller chip to the infrared sensing chip; and
   a plurality of through silicon vias (TSVs), disposed in the second substrate;
   a package substrate, carrying the microcontroller chip, and receiving an output signal or an input signal of the microcontroller chip through the TSVs, and comprising a plurality of contacts disposed on a lower surface thereof, and the TSVs electrically connected to the contacts; and
   a sealing encapsulation, covering the package substrate, the microcontroller chip, the infrared sensing chip, and the silicon cover, and an upper surface of the silicon cover being exposed from the sealing encapsulation.

2. The infrared thermopile sensor in claim 1, wherein the microcontroller chip calculates the object temperature according to the calibrated ambient temperature information after subtracting the compensation temperature signal from the object corresponding temperature signal.

3. The infrared thermopile sensor in claim 2, wherein the microcontroller chip calculates the object temperature according to the calibrated ambient temperature information after subtracting the compensation temperature signal multiplied with a first parameter from the object corresponding temperature signal, and the first parameter is numerical value of the compensation temperature signal divided by numerical value of the object corresponding temperature signal.

4. The infrared thermopile sensor in claim 1, wherein the infrared sensing chip and the microcontroller chip are glued together by a die attach film (DAF).

5. The infrared thermopile sensor in claim 1, wherein the first substrate comprises a second metal layer disposed on a lower surface thereof.

6. The infrared thermopile sensor in claim 1, wherein the front-end signal processing unit further comprises a signal selection multiplexer and a communication interface electrically connected with the ambient temperature sensing element and the non-volatile memory.

7. The infrared thermopile sensor in claim 1, wherein the ambient temperature sensing element comprises at least one thermal sensitive diode.

8. The infrared thermopile sensor in claim 7, wherein the thermal sensitive diode comprises a Schottky diode.

9. The infrared thermopile sensor in claim 1, wherein the silicon cover and the infrared sensing chip are bonded together by the wafer-level bonding with a photoresist layer and an adhesive.

10. The infrared thermopile sensor in claim 9, wherein a thickness of the photoresist layer is greater than or equal to about 50 μm and less than or equal to about 100 μm.

11. The infrared thermopile sensor in claim 1, wherein the silicon cover comprises a third metal layer disposed on a lower surface thereof corresponding to the second thermopile sensing element.

12. The infrared thermopile sensor in claim 1, wherein the silicon cover comprises a first cavity and a second cavity corresponding to the first thermopile sensing element and the second thermopile sensing element respectively, and the silicon cover and the infrared sensing chip are bonded together by the wafer-level bonding with a eutectic bonding or a solder bonding.

13. The infrared thermopile sensor in claim 12, wherein when the silicon cover and the infrared sensing chip are bonded together, the first cavity and the second cavity seal the first thermopile sensing element and the second thermopile sensing element respectively by a vacuum encapsulation.

14. The infrared thermopile sensor in claim 12, wherein a depth of the first cavity is greater than or equal to about 50 μm and less than or equal to about 100 μm.

15. The infrared thermopile sensor in claim 1, wherein the silicon cover comprises a fourth metal layer disposed on the upper surface thereof corresponding to the second thermopile sensing element.

16. The infrared thermopile sensor in claim 1, wherein the metal material of the first metal layer comprises an aluminum.

17. The infrared thermopile sensor in claim 1, wherein the infrared sensing chip is a silicon on insulator (SOI) chip, and a packaging height of the infrared thermopile sensor is less than 1 mm.

18. The infrared thermopile sensor in claim 17, wherein a depth of an oxide insulating layer in the SOI chip is greater than about 2 μm.

19. The infrared thermopile sensor in claim 18, wherein the depth of the oxide insulating layer is greater than about 10 μm.

\* \* \* \* \*